(12) United States Patent
Keller et al.

(10) Patent No.: US 10,572,014 B2
(45) Date of Patent: *Feb. 25, 2020

(54) VIRTUAL REALITY GARMENT CONFIGURED TO RESTRICT USER MOVEMENT BY REPOSITIONING A RIGID CUFF RELATIVE TO THE USER

(71) Applicant: Facebook Technologies, LLC, Menlo Park, CA (US)

(72) Inventors: Sean Jason Keller, Kirkland, WA (US); Tristan Thomas Trutna, Seattle, WA (US); Garett Andrew Ochs, Seattle, WA (US); Nicholas Roy Corson, Mukilteo, WA (US); Raymond King, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 95 days.

This patent is subject to a terminal disclaimer.

(21) Appl. No.: 15/285,298

(22) Filed: Oct. 4, 2016

(65) Prior Publication Data

US 2017/0131769 A1    May 11, 2017

Related U.S. Application Data

(60) Provisional application No. 62/253,084, filed on Nov. 9, 2015.

(51) Int. Cl.
   *G06F 3/01* (2006.01)

(52) U.S. Cl.
   CPC .............. *G06F 3/016* (2013.01); *G06F 3/011* (2013.01); *G06F 3/014* (2013.01); *G06F 3/017* (2013.01)

(58) Field of Classification Search
   CPC combination set(s) only.
   See application file for complete search history.

(56) References Cited

U.S. PATENT DOCUMENTS

| | | | | |
|---|---|---|---|---|
| 5,631,861 A * | 5/1997 | Kramer | ................... | G06F 3/011 414/5 |
| 6,042,555 A * | 3/2000 | Kramer | ................... | A61B 5/225 600/595 |
| 2005/0052412 A1* | 3/2005 | McRae | .................... | A63F 13/06 345/158 |
| 2005/0273027 A1* | 12/2005 | Farrell | .................... | A63B 23/16 602/21 |
| 2007/0199131 A1* | 8/2007 | Adams, Jr. | ........... | A63B 21/045 2/163 |
| 2008/0163876 A1* | 7/2008 | Phelan | .................. | A61F 5/0118 128/879 |
| 2012/0065026 A1* | 3/2012 | Land | ................ | A63B 21/00065 482/47 |

(Continued)

*Primary Examiner* — Temesghen Ghebretinsae
*Assistant Examiner* — Sosina Abebe
(74) *Attorney, Agent, or Firm* — Fenwick & West LLP

(57) ABSTRACT

An input interface configured to be worn on a portion of a user's body includes tendons coupled to various rigid cuffs in the input interface. The tendons include one or more activation mechanisms that, when activated, retract the tendons, which repositions a rigid cuff into a position relative to the user's body that restricts or prevents some form of movement of the user's body. Various activation mechanisms may be included in the tendons in various embodiments.

20 Claims, 16 Drawing Sheets

(56) References Cited

U.S. PATENT DOCUMENTS

2015/0109197 A1* 4/2015 Takagi .................. G06F 3/0233
　　　　　　　　　　　　　　　　　　　　　　345/156
2016/0313798 A1* 10/2016 Connor .................. G06F 3/017
2016/0363997 A1* 12/2016 Black ....................... G06F 3/014

* cited by examiner

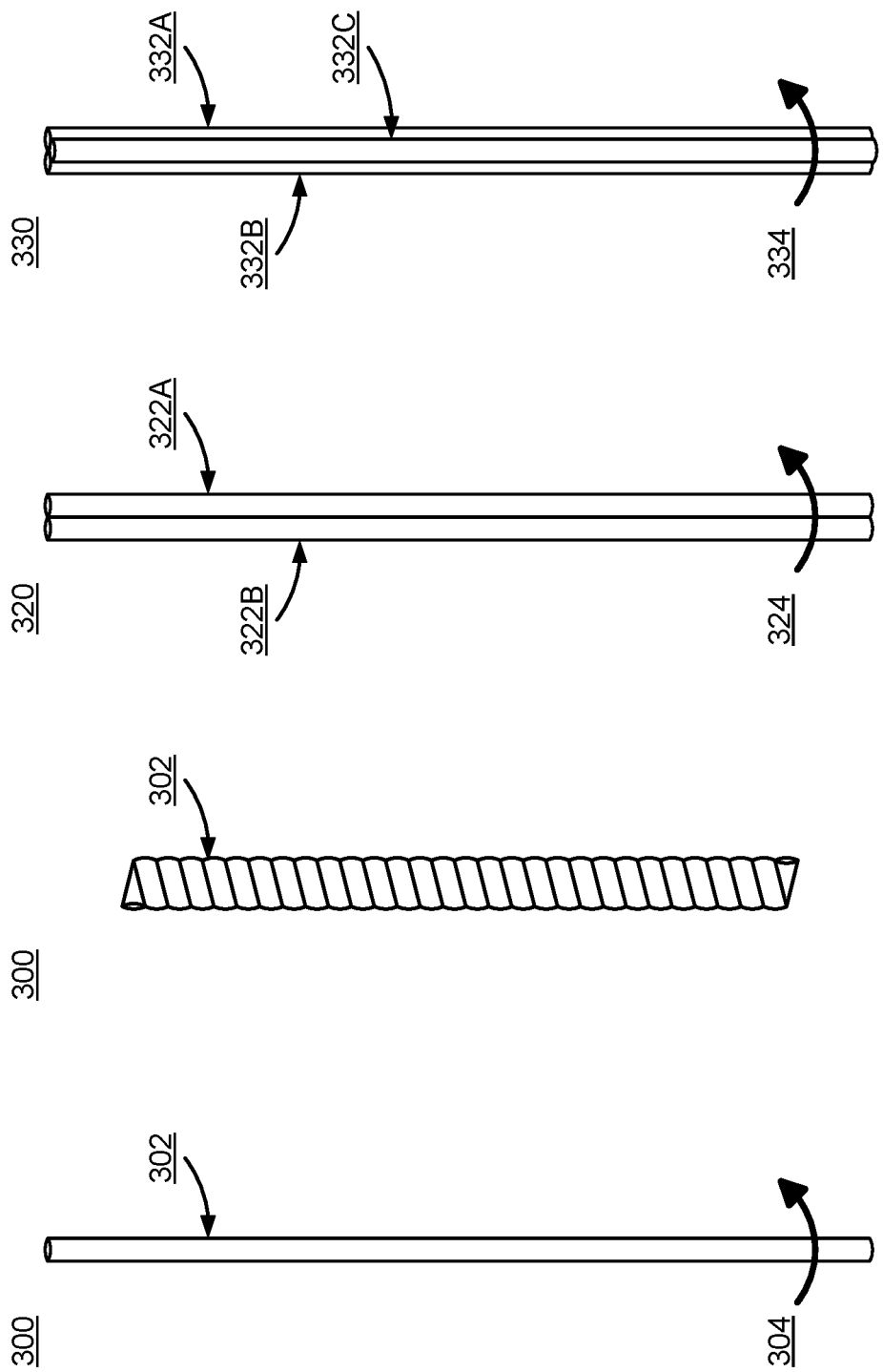

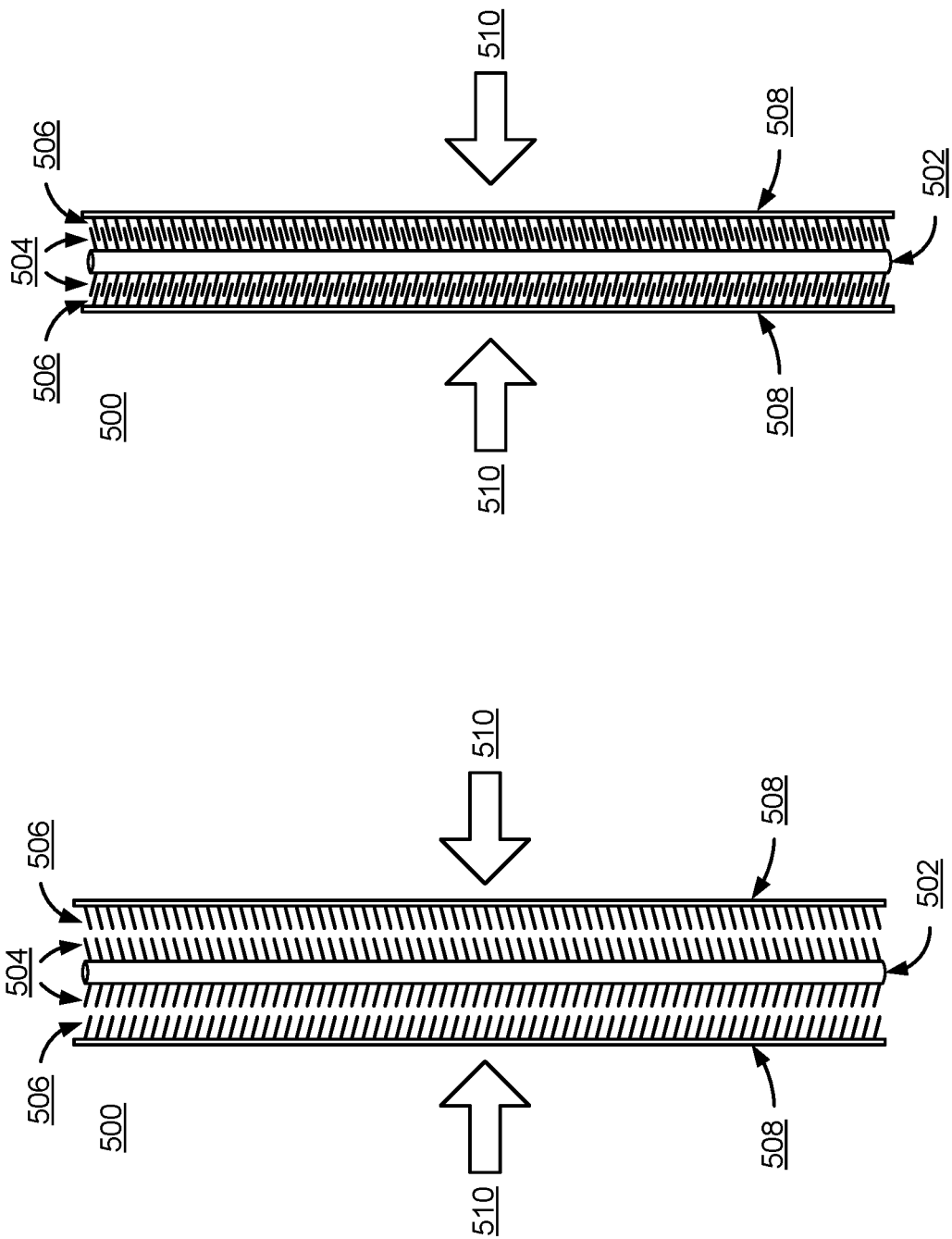

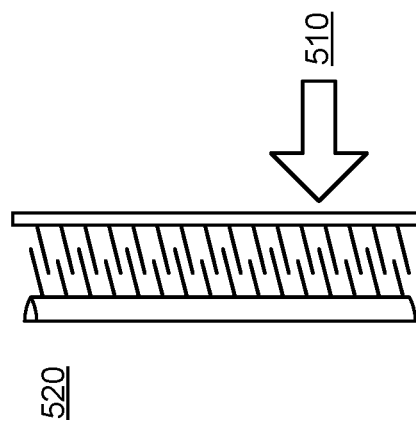
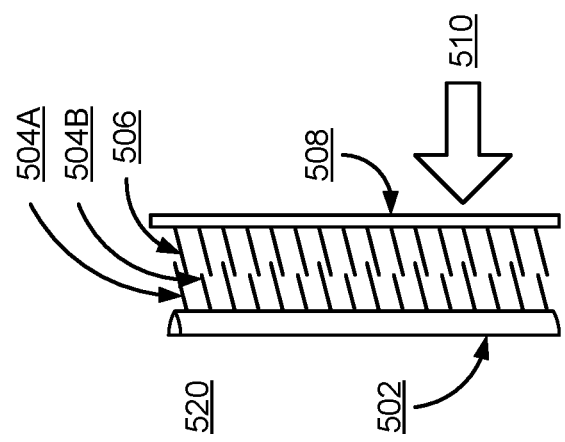
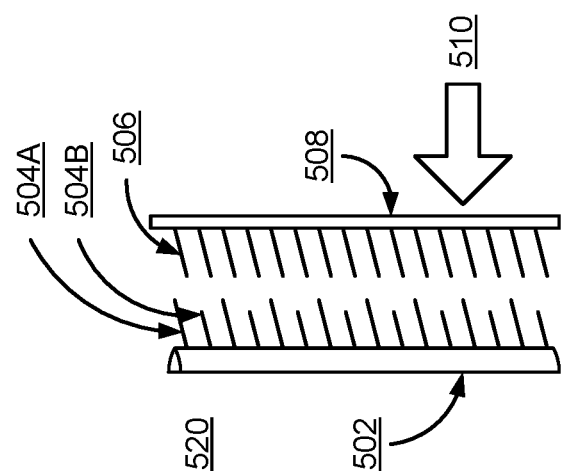

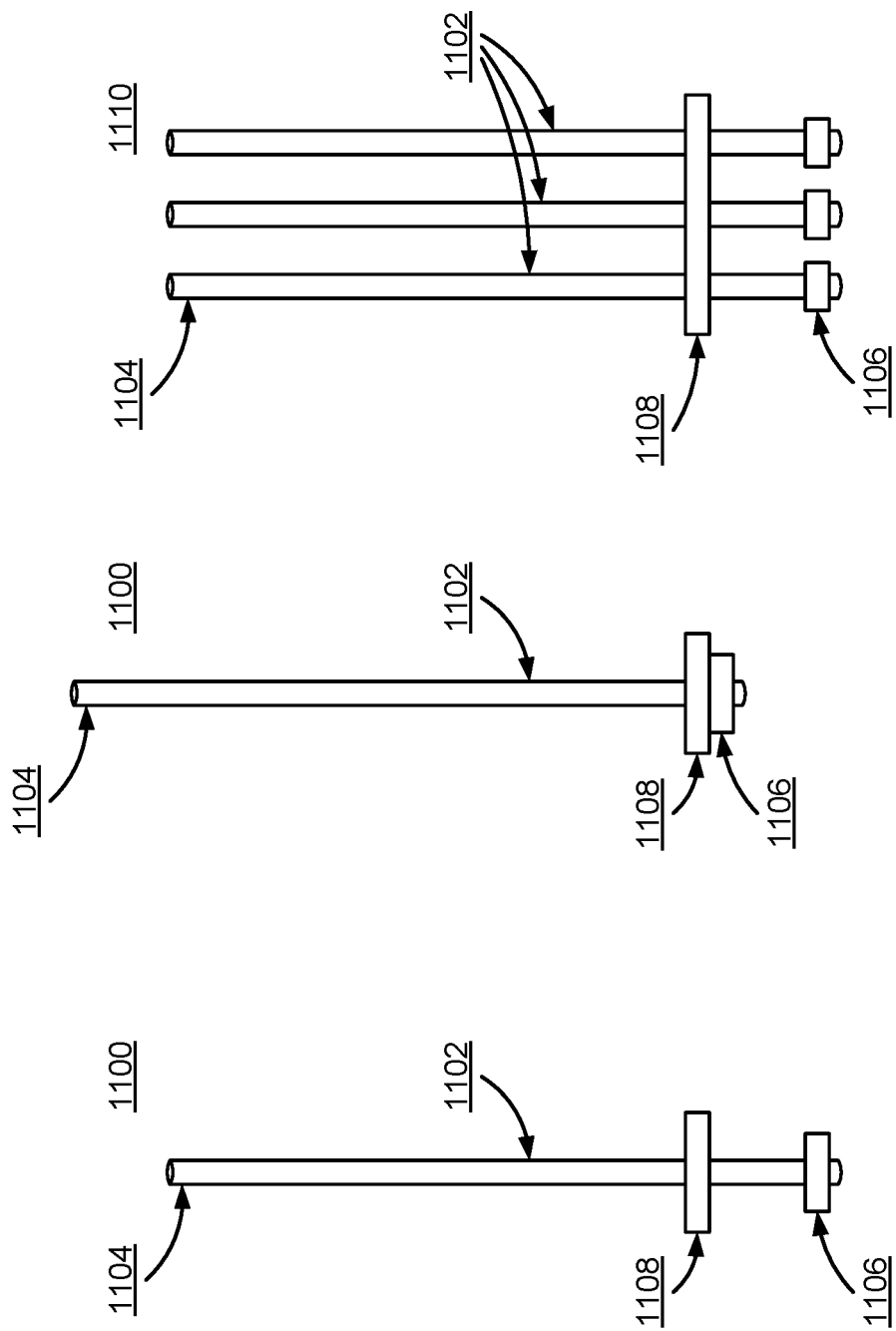

VIRTUAL REALITY GARMENT CONFIGURED TO RESTRICT USER MOVEMENT BY REPOSITIONING A RIGID CUFF RELATIVE TO THE USER

CROSS REFERENCE TO RELATED APPLICATIONS

This application claims the benefit of U.S. Provisional Application No. 62/253,084, filed Nov. 9, 2015, which is incorporated by reference in its entirety.

BACKGROUND

Virtual reality (VR) systems typically provide multiple forms of sensory output, such as a VR headset and headphones, which operate together to create the illusion that a user is immersed in a virtual world. A VR system can also include an input device such as a VR glove that detects position, acceleration, orientation, and other information associated with the user's hand and provides the information as input. The input can then be used to move a corresponding item in the virtual world (e.g., a hand or other appendage belonging to a character in the virtual world) when the glove detects movement of the user's hand in the real world. A VR glove can also be used to facilitate interactions with other objects in the virtual world. For example, the VR system can allow the user to use the glove to manipulate virtual objects by touching them, picking them up, and moving them.

SUMMARY

To further improve the illusion that the user is manipulating virtual objects, an input interface of a virtual reality (VR) system includes a haptic feedback mechanism preventing or jamming movement of one or more portions of a user's body. For example, a glove includes a jamming mechanism that restricts movement of one or more portions of a user's hand, such as bending of one or more fingers of the user's hand. This allows the input interface to better simulate a physical sensation of touching or contacting when the user interacts with a virtual object presented by the VR system. For example, to simulate the sensation of holding a coffee mug, a haptic feedback mechanism included in a glove prevents the user from curling the user's fingers any further after the user's fingers reached a position equivalent to making physical contact with the coffee mug.

In various embodiments, the haptic feedback mechanism comprises a jamming mechanism comprising a rigid cuff coupled to a tendon. For example, the jamming mechanism comprises a rigid cuff included in a glove and one or more tendons coupled to the rigid cuff. The tendon includes one or more activation mechanisms that retract the tendon when activated. Retraction of the tendon repositions the rigid cuff into a position relative to the user's body that restricts or prevents movement of a portion of the user's body. For example, if the jamming mechanism is included in a glove, when one or more activation mechanisms are activated, the tendon contracts and repositions the rigid cuff to a position covering a joint of the user's finger, preventing the joint from bending. In various embodiments, the jamming mechanism also includes a retraction mechanism that repositions the rigid cuff into its original position relative to the user's body to remove the restriction of movement of the user's body. For example, the retraction mechanism is a spring coupled to the rigid cuff that is stretched when the rigid cuff is repositioned and that relaxes when the activation mechanism is not activated, which repositions the rigid cuff back to its original position. As another example, an additional tendon is coupled to the rigid cuff and positioned so that when one or more activation mechanisms. When activation mechanisms included in the tendon are not activated, activation mechanisms in the additional tendon are activated, contracting the additional tendon and repositioning the rigid cuff away from the position restricting movement of the user (e.g., repositions the rigid cuff to its original location).

BRIEF DESCRIPTION OF THE DRAWINGS

FIG. 3A illustrates a jamming system comprising a twisted string in an unjammed state, in accordance with various embodiments.

FIG. 3B illustrates a jamming system comprising a twisted string in an unjammed state, in accordance with an embodiment.

FIG. 3C illustrates a jamming system comprising two parallel strings in an unjammed state, in accordance with an embodiment.

FIG. 3D illustrates a jamming system comprising three parallel strings in an unjammed state, in accordance with an embodiment.

FIG. 5A illustrates a jamming system comprising a concentric tendon and sheath in an unjammed state, in accordance with various embodiments.

FIG. 5B illustrates a jamming system comprising a concentric tendon and sheath in a jammed state, in accordance with an embodiment.

FIGS. 5C-5E illustrate a jamming system comprising a concentric tendon and sheath having inner filaments of different lengths protruding from the tendon.

FIGS. 11A and 11B illustrate a jamming system comprising a movable tendon, in accordance with various embodiments.

FIG. 11C illustrates a jamming system comprising multiple movable tendons, in accordance with an embodiment.

DETAILED DESCRIPTION

System Overview

Figure 1:
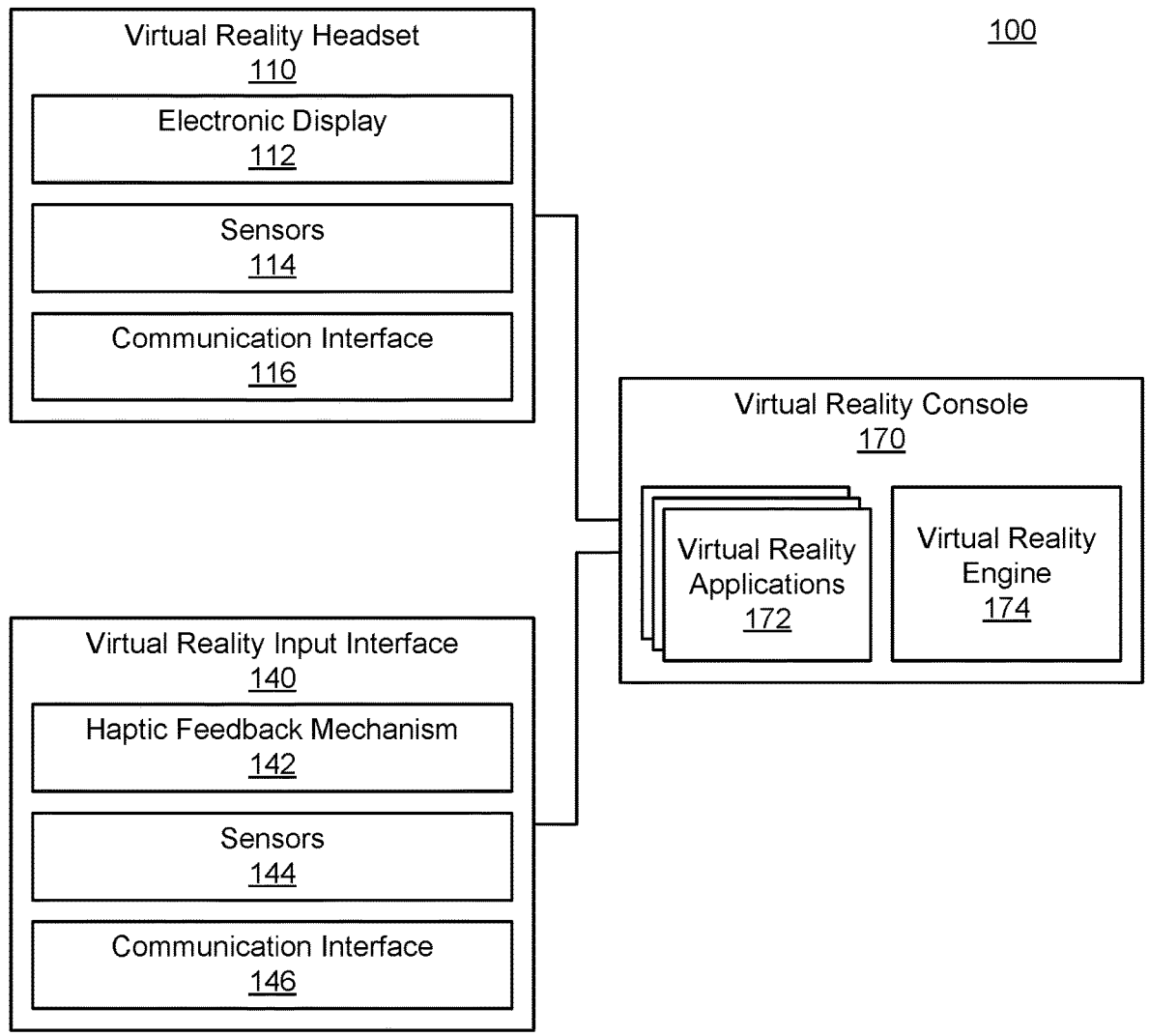
FIG. 1 is a block diagram of a virtual reality system, in accordance with an embodiment.

FIG. 1 is a block diagram of a virtual reality (VR) system 100 in which the VR glove 140 operates. The system environment 100 shown in FIG. 1 comprises a VR headset 110 and a VR glove 140 that are both coupled to a VR console 170. While FIG. 1 shows an example system 100 including one VR headset 110 and one VR glove 140, in other embodiments any number of these components may be included in the system 100. For example, the system 100 may include two VR gloves 140 (e.g., one for each hand) that are worn by the same user. As another example, the system 100 may include multiple VR gloves 140 intended to be worn by multiple users, with each VR glove 140 or each pair of VR gloves 140 associated with a different VR headset 110. In alternative configurations, different and/or additional components may be included in the system environment 100.

The VR headset 110 is a head-mounted display that presents media to a user. Examples of media presented by the VR headset 110 include images, video, audio, or some combination thereof. In some embodiments, audio is presented via an external device (e.g., speakers and/or headphones) that receives audio information from the VR headset 110, the VR console 170, or both, and presents audio data based on the audio information.

The VR headset 110 includes an electronic display 112, sensors 114, and a communication interface 116. The electronic display 112 displays images to the user in accordance with data received from the VR console 170. In various embodiments, the electronic display 112 may comprise a single electronic display 112 or multiple electronic displays 112 (e.g., one display for each eye of a user).

The sensors 114 include one or more hardware devices that detect spatial and motion information about the VR headset 110. Spatial and motion information can include information about the position, orientation, velocity, rotation, and acceleration of the VR headset 110. For example, the sensors 114 may include gyroscope that detects rotation of the user's head while the user is wearing the VR headset 110. This rotation information can then be used (e.g., by the VR engine 176) to adjust the images displayed on the electronic display 112.

The communication interface 116 enables input and output to the VR console 170. In some embodiments, the communication interface 116 is a single communication channel, such as HDMI, USB, VGA, DVI, or DisplayPort. In other embodiments, the communication interface 116 includes several distinct communication channels operating together or independently. In one embodiment, the communication interface 116 includes wireless connections for sending data collected by the sensors 114 from the VR headset 110 to the VR console 170 but also includes a wired HDMI connection or DVI connection that receives audio/visual data to be rendered on the electronic display 112.

The virtual reality glove 140 is a garment that is worn on the user's hand. The VR glove 140 collects information about the user's hand that can be used as input for virtual reality applications 172 executing on the VR console 170. In the illustrated embodiment, the VR glove 140 includes a haptic feedback mechanism 142, sensors 144, and a communication interface 146. The VR glove 140 may include additional components that are not shown in FIG. 1, such as a power source (e.g., an integrated battery, a connection to an external power source, a container containing compressed air, or some combination thereof).

The haptic feedback mechanism 142 provides haptic feedback to the user by forcing the user's hand to move in certain ways and/or preventing the user from moving his hand in certain ways. To prevent the user from moving his hand in certain ways, the haptic feedback mechanism 142 includes jamming systems that can operate by applying a force to counteract hand movements detected by the sensors 114, increasing the rigidity of certain portions of the VR glove 140, or some combination thereof. In other embodiments, the haptic feedback mechanism 142 increase a rigidity of certain portions of the VR glove 140 perceived by a user of the VR glove or change a stiffness of a material comprising the VR glove 140 or a component of the VR glove 140. Various embodiments of jamming systems are described with reference to FIGS. 2-11.

The sensors 144 include one or more hardware devices that detect spatial and motion information about the VR glove 140. Spatial and motion information can include information about the position, orientation, velocity, rotation, and acceleration of the VR glove 140 or any subdivisions of the VR glove 140, such as fingers, fingertips, knuckles, the palm, or the wrist.

The communication interface 146 enables input and output to the VR console 170. In some embodiments, the communication interface 146 is a single communication channel, such as USB. In other embodiments, the communication interface 146 includes several distinct communication channels operating together or independently. For example, the communication interface 146 may include separate communication channels for receiving control signals for the haptic feedback mechanism 142 and sending data from the sensors 144 to the VR console 170. The one or more communication channels of the communication interface 146 can be implemented as wired or wireless connections.

The VR console 170 is a computing device that executes virtual reality applications to process input data from the sensors 114, 144 on the VR headset 110 and VR glove 140 and provide output data for the electronic display 112 on the VR headset 110 and the haptic feedback mechanism 142 on the VR glove 144. The VR console 170 can be implemented as any kind of computing device, such as an integrated system-on-a-chip, a microcontroller, a desktop or laptop computer, a server computer, a tablet, a smart phone or other mobile device. Thus, the VR console 170 includes that includes components common to typical computing devices, such as a processor, random access memory, a storage device, a network interface, an I/O interface, and the like.

The processor may be or include one or more microprocessors or application specific integrated circuits (ASICs). The memory may be or include RAM, ROM, DRAM, SRAM and MRAM, and may include firmware, such as static data or fixed instructions, BIOS, system functions, configuration data, and other routines used during the operation of the computing device and the processor. The memory also provides a storage area for data and instructions associated with applications and data handled by the processor.

The storage device provides non-volatile, bulk or long term storage of data or instructions in the computing device. The storage device may take the form of a magnetic or solid state disk, tape, CD, DVD, or other reasonably high capacity addressable or serial storage medium. Multiple storage devices may be provided or available to the computing device. Some of these storage devices may be external to the computing device, such as network storage or cloud-based storage. The network interface includes an interface to a network and can be implemented as either wired or wireless interface. The I/O interface interfaces the processor to peripherals (not shown) such as, for example and depending upon the computing device, sensors, displays, cameras, color sensors, microphones, keyboards and USB devices.

In the example shown in FIG. 1, the VR console 170 further includes VR applications 172 and a virtual reality (VR) engine 174. In some embodiments, the VR applications 172 and the VR engine 174 are implemented as software modules that are stored on the storage device and executed by the processor. Some embodiments of the VR console 170 include additional or different components than those described in conjunction with FIG. 1. Similarly, the functions further described below may be distributed among components of the VR console 170 in a different manner than is described here.

Each VR application 172 is a group of instructions that, when executed by a processor, generates virtual reality content for presentation to the user. A VR application 172 may generate VR content in response to inputs received from the user via movement of the VR headset 110 or the VR glove 170. Examples of VR applications 172 include gaming applications, conferencing applications, video playback applications, or other suitable applications.

The VR engine 174 is a software module that allows VR applications 172 to operate in conjunction with the VR headset 110 and VR glove 170. In some embodiments, the VR engine 174 receives information from sensors 114 on the VR headset 110 and provides the information to a VR application 172. Based on the received information, the VR engine 155 determines media content to provide to the VR headset 110 for presentation to the user via the electronic display 112 and/or haptic feedback to provide to the VR glove 170 to provide to the user via the haptic feedback mechanism. For example, if the VR engine 174 receives information from the sensors 114 on the VR headset 110 indicating that the user has looked to the left, the VR engine 174 generates content for the VR headset 110 that mirrors the user's movement in a virtual environment.

Similarly, in some embodiments the VR engine 174 receives information from the sensors 144 on the VR glove and provides the information to a VR application 172. The application 172 can use the information to perform an action within the virtual world of the application 172. For example, if the VR engine 174 receives information from the sensors 144 that the user has closed his fingers around a position corresponding to a coffee mug in the virtual environment and raised his hand, a simulated hand in the VR application 172 picks up the virtual coffee mug and lifts it to a corresponding height.

The VR engine 174 may also provide feedback to the user that the action was performed. The provided feedback may be visual via the electronic display 112 in the VR headset 110 (e.g., displaying the simulated hand as it picks up and lifts the virtual coffee mug) or haptic feedback via the haptic feedback mechanism 142 in the VR glove 140 (e.g., preventing the user's finger's from curling past a certain point to simulate the sensation of touching a solid coffee mug).

Inflatable Tendons

Figure 2B:
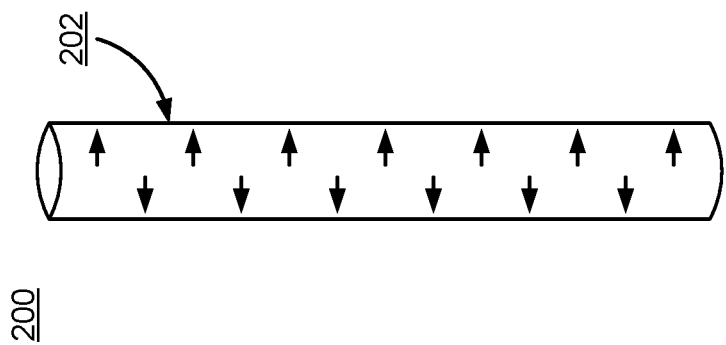
FIG. 2B illustrates the jamming system comprising the inflatable tendon in a jammed state, in accordance with an embodiment.
Figure 2A:
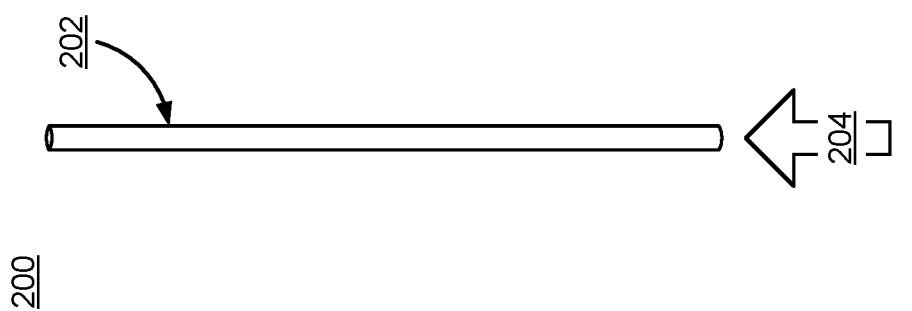
FIG. 2A illustrates a jamming system comprising an inflatable tendon in an unjammed state, in accordance with an embodiment.

FIGS. 2A-2B illustrate a jamming system 200 comprising an inflatable tendon, in accordance with an embodiment. The system 200 includes an inflatable tendon 202 that encloses a volume of fluid (e.g., air). The tendon 202 is secured to a portion of the VR glove 140 corresponding to at least one joint on the user's hand. For example, the tendon 202 may be secured over a joint on one of the fingers. Alternatively, the tendon 202 may be long enough to extend over two or all three joints of a finger.

In its unjammed state, as shown in FIG. 2A, the tendon 202 is deflated and encloses a volume of fluid that is small enough for the tendon 202 to remain flexible. As a result, the tendon 202 does not inhibit the movement of the corresponding joint.

To transition the system 200 to its jammed state, fluid is added 204 to the tendon 202 to inflate the tendon 202. An example of an inflated tendon 202 (i.e., the system 200 in its jammed state) is shown in FIG. 2B. Because an inflated tendon 202 has significantly less flexibility than an uninflated tendon 202, inflating the tendon 202 has the effect of inhibiting movement of the corresponding joint.

Twisted String

FIGS. 3A-3D illustrate jamming systems 300, 320, 330 comprising a twisted string, in accordance with various embodiments. FIG. 3A illustrates the system in its unjammed state 300A, according to one embodiment. In the embodiment illustrated in FIG. 3A, the system 300 comprises a single string 302. The string 302 is secured to the fabric of the VR glove 140 in a region of the glove 140 corresponding to a joint. In various embodiments, the string 302 is included in an enclosure configured to accommodate changes in the diameter of the string 302. For example, the enclosure is a flexible cable having a housing enclosing the string 302 configured to transmit force from movement of the string 302 relative to the housing, such as a Bowden cable. The enclosure may be integrated into or coupled to the glove 140 at attachment and termination points in different embodiments so that activation of a jamming system 300, 320, 330 affects an appropriate portion of the glove 140. For example, the string 302 may be secured to the portion of the glove 140 that covers the top, side, or bottom surfaces of a knuckle when the glove 140 is worn. In some embodiments, the string 302 is long enough to extend over multiple knuckles, which allows for a single string 302 to resist the movement of multiple joints when the string 302 is in its jammed state. In some embodiments, the string 302 is enclosed in a flexible cylindrical sheath (not shown), and the sheath is attached to the fabric of the VR glove 140.

In the unjammed state, the string 302 has at least the same level of flexibility as the fabric of the VR glove 140. For example, the string 302 may be made of the same material as the fabric. As a result, the string does not inhibit the user's movement in its unjammed state.

To transition the string 302 to its jammed state, torque 304 is applied to the string 302 to twist the string 302. In one embodiment, the jamming system 300 includes a motor integrated into the structure of the VR glove with a shaft that is mechanically coupled to the string 302. In this embodiment, the torque 304 is applied by sending a control signal (e.g., from the VR engine 174 on the VR console 170) to the motor that causes the motor to rotate. In other embodiments, various types of actuators providing rotary motion may be used as the motor (e.g., an electric motor, a pneumatic rotary motor).

FIG. 3B illustrates the system 300 in its jammed state. In the jammed state, the string 302 is twisted to a level of tightness that makes the string 302 rigid enough to resist bending. As a result, the twisted string 302 prevents the user from moving the joint corresponding to the string 302. In some embodiments, the string 302 can be twisted to different levels of tightness, and each level of tightness causes the string 302 to have a different level of rigidity. This advantageously allows the string 302 to have different levels of resistance and simulate a broader range of tactile sensations.

FIGS. 3C and 3D illustrate alternative embodiments of the jamming system 320, 330 in its unjammed state. In the embodiment shown in FIG. 3C, the system 320 includes two parallel strings 322A, 322B. In the embodiment shown in FIG. 3D, the system 330 includes three parallel strings 332A, 332B, 332C. In both embodiments, the system 320, 320 transitions from the unjammed state into the jammed state by applying a torque 324, 334 to the parallel strings 322A, 322B or 332A, 332B, 332C. Increasing the number of strings in the manner shown in these embodiments increasing the resistance of the system 320, 330 to twisting when in its jammed state, as well as increasing the maximum tensile strength of the strings. Similarly, increasing the diameter of one or more strings in these embodiments also increases the resistance of the system 320, 330 to twisting when in its jammed state.

Microcups

Figure 4B:
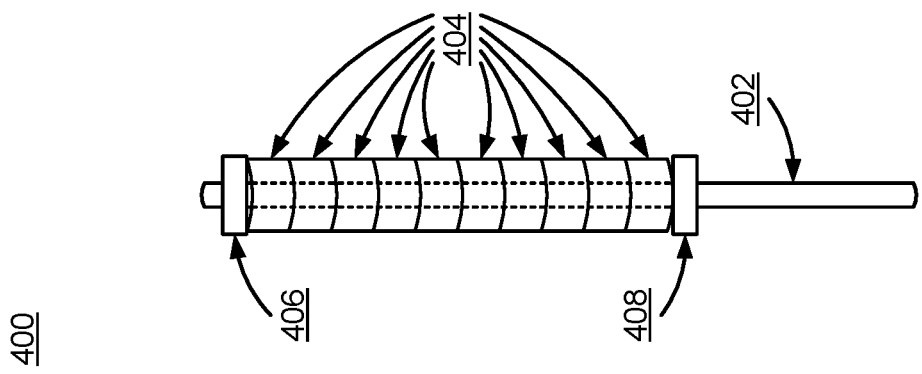
FIG. 4B illustrates a jamming system comprising a series of microcups in a jammed states, in accordance with an embodiment.
Figure 4A:
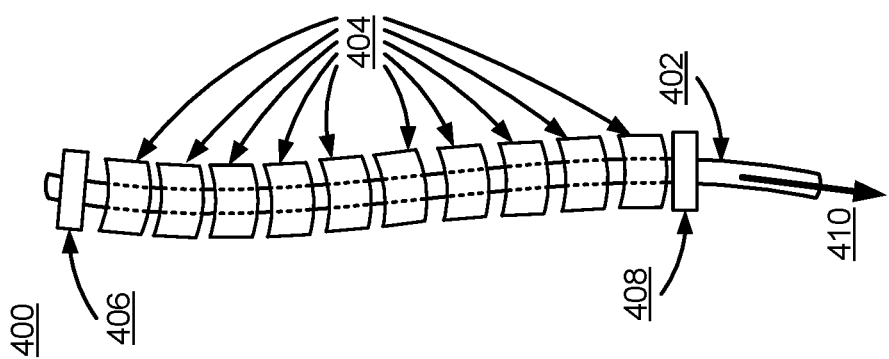
FIG. 4A illustrates a jamming system comprising a series of microcups in an unjammed state, in accordance with an embodiment.

FIGS. 4A-4B illustrate a jamming system 400 comprising a series of microcups 404, in accordance with various embodiments. Similar to the jamming system shown in FIGS. 3A-3D, the jamming system shown in FIGS. 4A and 4B is secured to the fabric of the VR glove 140 in a region of the glove 140 corresponding to one or more joints. For example, the components 402 through 408 shown in FIGS. 4A and 4B may be enclosed in a flexible cylindrical sheath that is attached to the fabric of the VR glove 140 in a region corresponding to the user's index finger.

FIG. 4A illustrates the system 400 in its unjammed state. The jamming system 400 includes a tendon 402, microcups 404, and end pieces 406, 408. The tendon 402 is threaded through the microcups 404 in a manner that allows the microcups 404 to move parallel to the tendon 402 but prevents the microcups 404 from moving perpendicular to the tendon 402. The top of each microcup 404 is has a shape that is capable of engaging with the bottom of the next microcup 404. In the illustrated embodiment, each microcup 404 has a concave top surface and a convex bottom surface. In other embodiments, the top surfaces of the microcups 404 have holes and the bottom surfaces have peg structures that are capable of fitting into the holes. In still other embodiments, the tops and bottoms of the microcups 404 are configured to engage with each other in some other manner.

The first end piece 406 at the top end of the tendon 402 is attached to the tendon 402 in a manner that prevents the first end piece 406 from moving relative to the tendon 402. Meanwhile, the second end piece 408 is attached to the fabric of the VR glove 140, and the tendon 402 is threaded through the second end piece 408. The microcups 404 are threaded along the tendon 402 between the two end pieces 406, 408.

When the jamming system 400 is in its unjammed state (as shown in FIG. 4A), the portion of the tendon 402 positioned between the two end pieces 406, 408 is long enough that there is enough space between each microcup 404 for the microcups 404 to move relative to each other along the tendon 402. As a result, the jamming system 400 remains flexible and moves with the fabric of the VR glove 140 without resisting the movement of the corresponding joint.

To transition the jamming system 400 to its jammed state, as shown in FIG. 4B, the VR glove 140 applies an axial force 410 on the tendon. In one embodiment, the jamming system 400 includes an actuator that applies the axial force in response to receive a control signal (e.g., from the VR engine 174 on the VR console 170). Because the first end piece 406 is fixed to the tendon 402 while the tendon 402 is merely threaded through the second end piece 408, applying the axial force 410 pulls the tendon 402 through the second end piece 408. This, in turn, reduces the portion of the tendon 402 that is positioned between the end pieces 406, 408 and pulls the microcups 404 together, causing the microcups 404 to engage with each other.

Once the microcups 404 engage with each other, they form a rigid column that resists movement of the corresponding portion of the VR glove 140. As a result, the system 400 prevents the user from moving the corresponding joint.

Concentric Tendon and Sheath

FIGS. 5A-5E illustrate jamming systems 500, 520 comprising a concentric tendon and sheath, in accordance with various embodiments. Similar to the jamming systems 300, 400 described with reference to FIGS. 3A-3D and 4A-4B, the jamming systems shown in FIGS. 5A-5E can be secured to the fabric of the VR glove 140 in a region of the glove 140 corresponding to one or more joints.

FIG. 5A illustrates the system 500 in its unjammed state 500, in accordance with one embodiment. In the illustrated embodiment, the system 500 includes a tendon 502, inner filaments 504, outer filaments 506, and a sheath 508. The inner filaments 504 are attached to the tendon 502 and protrude from the surface of the tendon 502. As shown in FIG. 5A, the inner filaments 504 protrude from the tendon 502 at a small angle relative to perpendicular. For example, the inner filaments 504 may be offset by an angle of 10, 20, 30 degrees, or by some other angle. In other embodiments, the inner filaments 504 are perpendicular to the surface of the tendon 502. The angle of the inner filaments 504 relative to perpendicular may be used to tune a release point of the system 500 or to bias the system 500 to jam in a direction and remain unjammed in another direction. Additionally, the angle of the inner filaments 504 relative to perpendicular may modify the response of the system 500 to external pressure (e.g., a linear response to external pressure, a quadratic response to external pressure). If the inner filaments 504 are perpendicular and longer than the critical length for Euler buckling, compression of the inner filaments 504 may exhibit different modes of interaction with each other, as normal forces increase a likelihood that a perpendicular internal filament 504 will buckled. When an initial perpendicular internal filament 504 buckles, force on other internal filaments 504 increases, which increases a likelihood of the other internal filaments 504 buckling, which produces a cascade effect after which bulk properties differ.

The tendon 502 and the inner filaments 504 are enclosed in a sheath 508. The outer filaments 506 are attached to the interior surface of the sheath 508 and protrude from the interior surface of the sheath 508. In the embodiment shown in FIG. 5A, the outer filaments 506 protrude at an angle relative to perpendicular that makes the outer filaments 506 parallel to the inner filaments 504. In other embodiments, the outer filaments 506 are perpendicular to the interior surface of the sheath 508.

When the system 500 is in its unjammed state, the inner filaments 504 and the outer filaments 506 are not in physical contact with each other, so the tendon 502 and the sheath 508 are free to move relative to each other. The tendon 502 and the sheath 508 are both made of materials that have at least the same amount of flexibility as the fabric of the VR glove 140. Thus, when the system 500 is in its unjammed state, the system moves with the VR glove 140 and does not impede movement of the joint corresponding to the system.

To transition to system 500 into its jammed state, an inward force 510 is applied to press the outer filaments 506 against the inner filaments 504. In some embodiments, the force 510 is applied with a device external to the sheath 508. For example, the system 500 further includes an inflatable bladder, and air (or some other gas) can be added to the bladder to press the sheath 508 and outer filaments 506 against the inner filaments 504. The inflatable bladder can either enclose the entire outer surface of the sheath 508 or only exert force 510 on the sheath 508 from one (or multiple) directions. As another example, the system 500 further includes two conductive plates that are positioned on opposite sides of the sheath 508. To apply the inward force 510, a positive charge is applied to the first plate and a negative charge is applied to the second plate, which creates an electromagnetic force that pulls the plates together and compresses the sheath 508. In other embodiments, the force 510 is applied by removing air from the space between the tendon 502 and the sheath 508. Alternatively, the inner filaments 504 are coupled a coil, while the outer filaments 506 are coupled to a magnet, such as a flexible ceramic magnet. A current is applied to the coil, causing magnetic attraction pulling the coil and the magnet towards each other, which presses the inner filaments 504 to the outer filaments 506. Similarly, the inner filaments 504 may be coupled to the magnet and the outer filaments 506 coupled to the coil, and application of a voltage to the coil similarly create magnetic attraction pulling the coil and the magnet towards each other, pressing the inner filaments 504 to the outer filaments 506.

In the jammed state, as shown in FIG. 5B, the outer filaments 506 are engaged with the inner filaments 504. This prevents the outer filaments 508 from moving relative to the inner filaments 504, which in turn prevents the tendon 502 from sliding through the sheath 508. As a result, the system 500 in its jammed state inhibits movement of the corresponding joint on the user's hand.

FIGS. 5C-5E illustrate an alternative embodiment of a jamming system 520 with a concentric tendon and sheath. In this embodiment, the inner filaments 504A, 504B that protrude from the tendon 502 have different lengths. The outer filaments 506 that protrude from the interior surface of the sheath 508 still have the same length, but the outer filaments 506 may also have different lengths in other embodiments. Having filaments 504A, 504B of different lengths allows the system 520 to generate different levels of resistance. For example, the system 520 may be configured to exert an inward force 510 that engages the longer inner filaments 504A but does not engage the shorter inner filaments 504B, as shown in FIG. 5D. This provides an intermediate level of resistance between completely unengaged filaments, as shown in FIG. 5D, and completely engaged filaments, as shown in FIG. 5E.

Bag of Particles

Figure 6A:
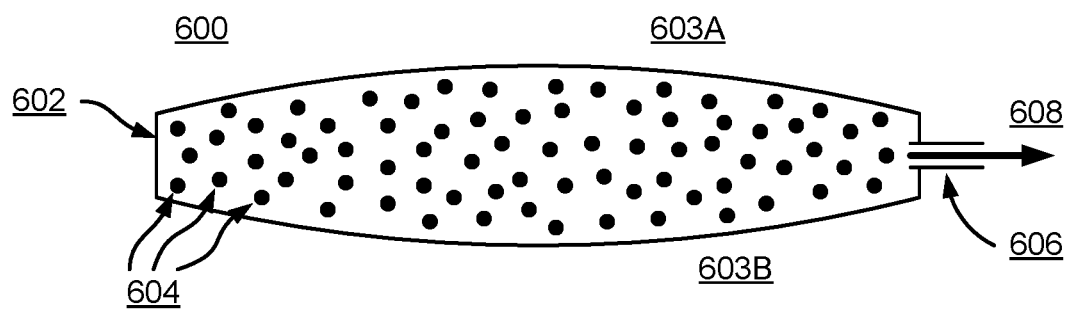
FIG. 6A illustrates a jamming system comprising a bag of particles in an unjammed state, in accordance with an embodiment.
Figure 6B:
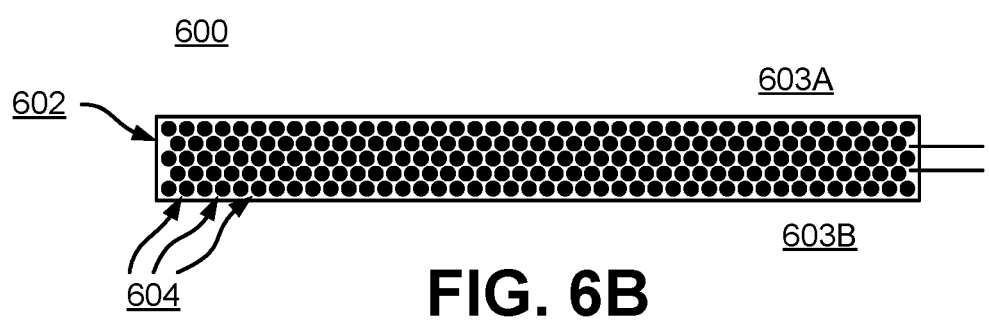
FIG. 6B illustrates a jamming system comprising a bag of particles in a jammed state, in accordance with an embodiment.

FIGS. 6A-6B illustrate a jamming system comprising a bag of particles, in accordance with an embodiment. The system includes a flexible bag 602 that encloses a plurality of particles 604. In one embodiment, the flexible bag 602 is secured to the fabric of the VR glove 140. For example, the bottom side 603B of the flexible bag 602 may be adhered to the fabric. In another embodiment, the flexible bag 602 is integrated into the VR glove 140 and takes the place of the fabric. For example, the VR glove 140 may be configured so that the bottom side 603B of the flexible bag 602 is in contact with the user's skin when the glove is worn while the top side 603A forms the exterior surface of the VR glove 140.

In some embodiments, the flexible bag 602 has a ring shape that encircles an entire joint on the user's hand in a manner similar to a blood pressure cuff. For example, the flexible bag 602 may encircle a joint on one of the user's fingers. In other embodiments, the flexible bag 602 covers one side of a joint. In still other embodiments, the flexible bag 602 encircles multiple joints or covers the same side of multiple joints. For example, the flexible bag 602 may encircle or cover both of the joints in one finger.

In the unjammed state, as shown in FIG. 6A, the flexible bag 602 further encloses a medium such as air, some other gas, or a liquid, and the particles 604 are free to move around in the medium. As a result, the particles 604 do not inhibit the flexibility of the bag 602, and the user is free to move the joints that the flexible bag encircles or covers.

To transition the system 600 to the jammed state, the medium is removed 608 from the flexible bag 602. In the embodiment shown in FIGS. 6A and 6B, the system includes a narrow channel 608 through which the medium is extracted. In other embodiments, a portion of the flexible bag 602 (or the entire flexible bag 602) is made of a porous material that allows the medium to pass through but does not allow the particles to pass through. An actuator external to the flexible bag 602 creates pressure external to the flexible bag 602 to remove the medium from the flexible bag. Alternatively, a vacuum pump is coupled to the flexible bag 602 to create a vacuum in the flexible bag 602, allowing external atmospheric pressure to remove the medium from the flexible bag 602.

FIG. 6B illustrates the system 600 in the jammed state. In the jammed state, the particles are packed close together within the flexible bag 602, which increases the rigidity of the flexible bag 602. The increased rigidity inhibits the movement of the joint (or joints) that the flexible bag encircles or covers.

Non-Newtonian Fluid

Figure 7A:
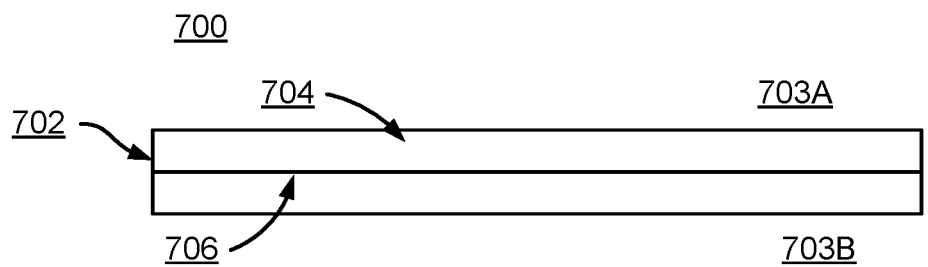
FIG. 7A illustrates a jamming system comprising a non-Newtonian fluid in an unjammed state, in accordance with an embodiment.
Figure 7B:
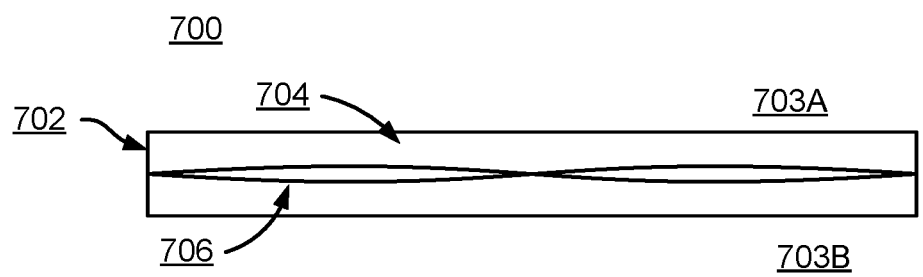
FIG. 7B illustrates a jamming system comprising a non-Newtonian fluid in a jammed state, in accordance with an embodiment.

FIGS. 7A-7B illustrate a jamming system 700 comprising a bag of non-Newtonian fluid, in accordance with an embodiment. The system 700 includes a flexible bag 702 that encloses a non-Newtonian fluid 704 an at least one filament 706 that is immersed in the non-Newtonian fluid 704. In one embodiment, the flexible bag 702 is secured to the fabric of the VR glove 140. For example, the bottom side 703B of the flexible bag 702 may be adhered to the fabric. In another embodiment, the flexible bag 702 is integrated into the VR glove 140 and takes the place of the fabric. For example, the VR glove 140 may be configured so that the bottom side 703B of the flexible bag 702 is in contact with the user's skin when the glove is worn while the top side 703A forms the exterior surface of the VR glove 140.

In some embodiments, the flexible bag 702 has a ring shape that encircles an entire joint on the user's hand in a manner similar to a blood pressure cuff. For example, the flexible bag 702 may encircle one of the user's knuckles. In other embodiments, the flexible bag 702 covers one side of a joint. In still other embodiments, the flexible bag 702 encircles multiple joints or covers the same side of multiple joints. For example, the flexible bag 702 may encircle or cover both of the joints in one finger.

The filament 706 is attached to an oscillator that causes the filament 706 to shake when the oscillator is activated (e.g., in response to a control signal from the VR engine 174). For example, a piezo-ultrasonic actuator or other ultrasonic actuator is attached to the filament 706 and shakes the filament when activated. As other examples, the oscillator is an eccentric rotating mass motor, a linear resonant actuator motor, or other suitable device coupled to the filament 706. In various embodiments, the filament 706 vibrates at frequencies between 1 Hz and 500 KHz.

In some embodiments, the non-Newtonian fluid 704 is a shear thickening fluid whose viscosity increases with the rate of shear strain. For example, the non-Newtonian fluid may be a suspension of starch in water. In these embodiments, the system 700 is in its unjammed state when the oscillator is inactive and, by extension, the fluid 704 has low viscosity. To transition the system to its jammed state, the oscillator is activated and the filament 702 begins shaking, as shown in FIG. 7B, which adds strain to the fluid 704 and increases its viscosity. In one embodiment, the oscillator operates at ultrasound frequencies. In another embodiment, the oscillator is capable of generating oscillations of different frequencies and/or amplitudes to increase the viscosity of the fluid 704 by different amounts. This allows the system 700 to produce different levels of jamming. For example, the system 700 may have a maximum rigidity setting that increases the viscosity of the fluid 704 by a large amount to immobilize the corresponding joint, one or more intermediate rigidity settings that increase the viscosity of the fluid by smaller amounts to inhibit movement of the joint without immobilizing it, and a low rigidity setting in which the oscillator is deactivated and does not cause the filament to apply any shear to the fluid 704.

In other embodiments, the non-Newtonian fluid 704 is a shear-thinning fluid whose viscosity decreases with the rate of shear strain. In these embodiments, the system is in its jammed state when the oscillator is deactivated, whereas the system is in its unjammed state when the oscillator is activated and causes the filament 702 to apply shear to the fluid 704. In these embodiments, the oscillator may be capable of generating oscillations of different frequencies and/or amplitudes to lower the viscosity of the fluid 704 by different amounts. A dynamic range of user finger movement is small relative to a full range of viscosity of the non-Newtonian fluid 704 as a function of stress curve, which allows movement of the user's finger.

Anisotropic Material

Figure 8B:
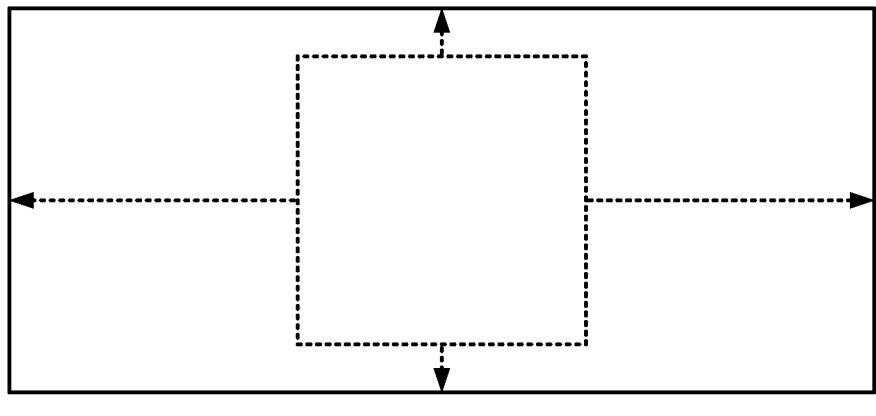
FIG. 8B illustrates a jamming system comprising an anisotropic material in a jammed states, in accordance with an embodiment.
Figure 8A:
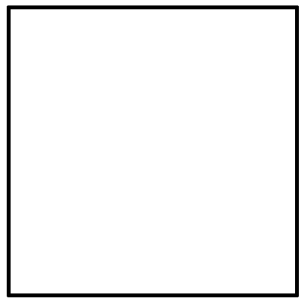
FIG. 8A illustrates a jamming system comprising an anisotropic material in an unjammed state, in accordance with various embodiments.

FIGS. 8A-8B illustrate a jamming system 800 comprising an anisotropic material, in accordance with various embodiments.

An anisotropic material is a material that has different material properties in different spatial dimensions. For example, an anisotropic material may expand more in one spatial dimension than in the others when it is heated (e.g., by running a current through the material) or when stress is applied. An example of an anisotropic material is shown in FIGS. 8A and 8B. For example, application of axial tension to a woven mesh cylinder decreases the diameter of the cylinder and increases circumferential pressure on an object (e.g., a portion of a user's finger, or knuckle) included in an interior of the woven mesh cylinder. In this example, a tendon or other actuator coupled to the woven mesh cylinder applies axial tension to the woven mesh cylinder, restricting movement of a joint of the user's body surrounded by the woven mesh cylinder. Hence, linear actuation of an anisotropic material around a fixed volume increases pressure and the anisotropic material's resistance to deformation.

Interdigitated Sheets

Figure 9A:
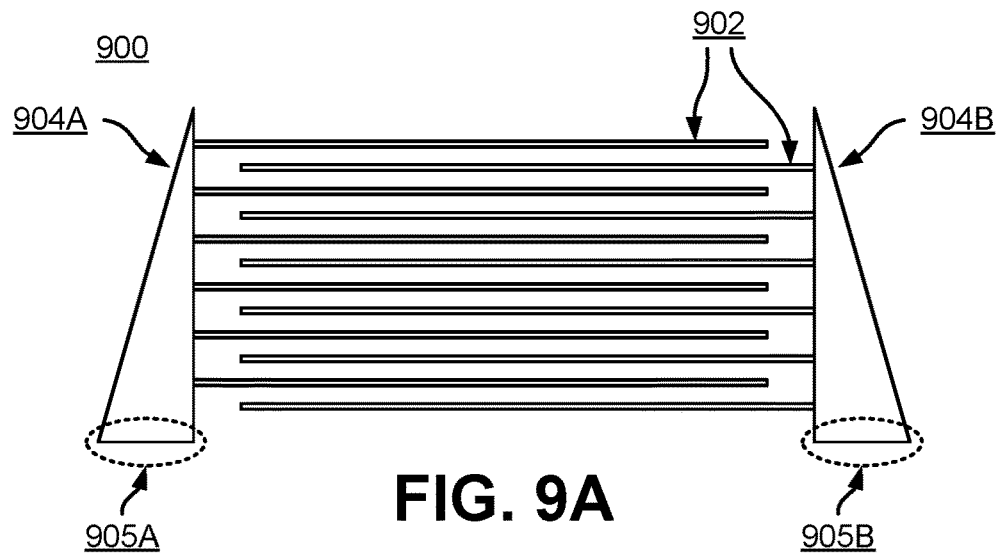
FIGS. 9A and 9B illustrate a jamming system comprising interdigitated sheets in an unjammed state, in accordance with an embodiment.
Figure 9B:
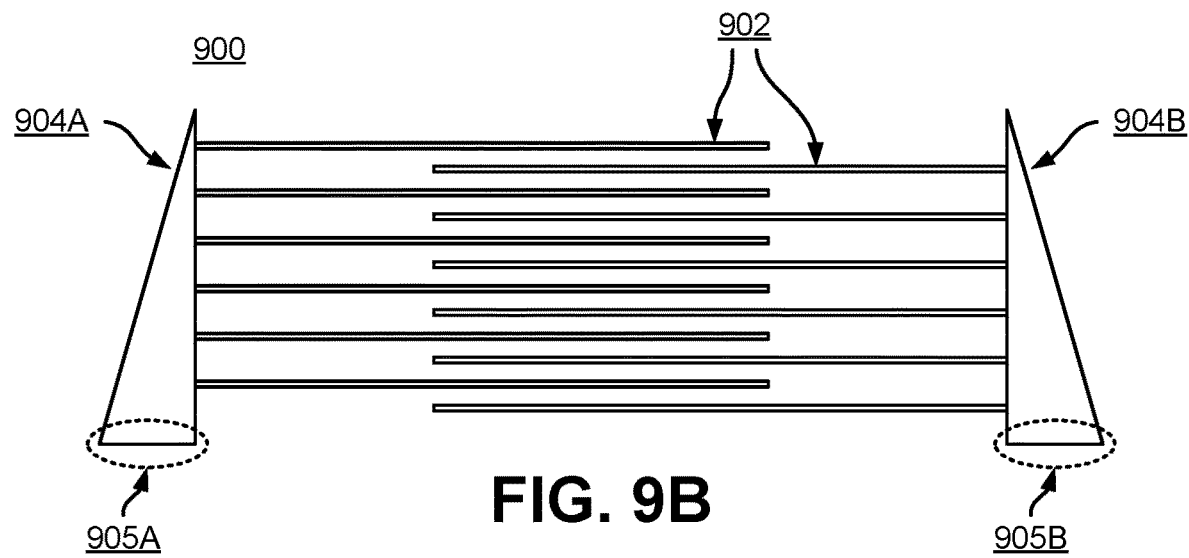

FIGS. 9A-9D illustrate a jamming system 900 comprising interdigitated sheets, in accordance with an embodiment. FIGS. 9A and 9B show the jamming system 900 in its unjammed state. The jamming system 900 comprises a plurality of flexible interdigitated sheets 902 and two mounting structures 904. Each flexible sheet 902 is mounted to one of two mounting structures 904, and the base 904A of each mounting structure 904 is secured to the fabric of the VR glove 140.

In the unjammed state, there is enough space between the flexible sheets 902 that flexible sheets 902 mounted to the left mounting structure 904A can move relative to flexible sheets 902 mounted to the right mounting structure 904B without substantial friction. For example, without external pressure, friction between the flexible sheets 902 is negligible, allowing flexible sheets 902 mounted to left mounting structure 904A to move relative to flexible sheets 902 mounted to the right mounting structure 904B when the flexible sheets 902 contact each other. In some embodiments, pressure in the space between the flexible sheets 902 is greater than a pressure external to the space between the flexible sheets 902 (i.e., positive pressure between the flexible sheets 902) to allow the jamming system 900 to more quickly return to the unjammed state.

In one embodiment, the jamming system 900 is secured to a portion of the VR glove 140 corresponding to the dorsal side of a finger (i.e., the containing the fingernail). For example, the bases 905 of the mounting structures 904 are secured to opposite sides of a joint. Normally, the dorsal side increases in length when the user curls his finger. If the system 900 is in its unjammed state, the lack of any substantial friction between the flexible sheets 902 allows the mounting structures to 904 to move apart from each other, as shown in FIG. 9B, when the user curls his finger.

Figure 9C:
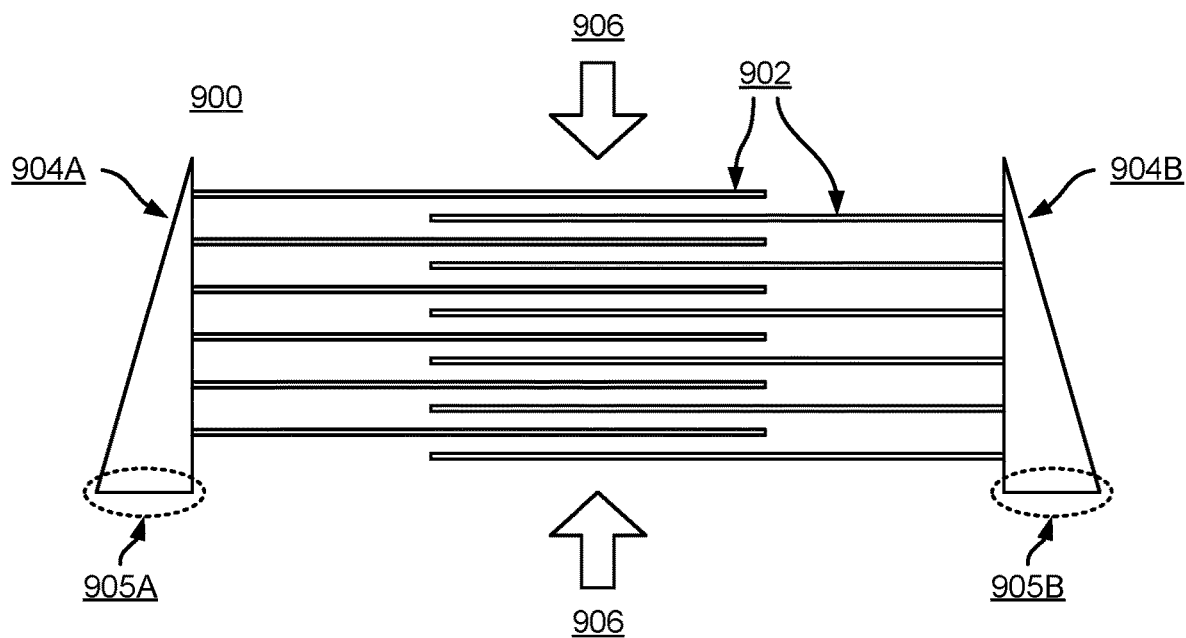
FIGS. 9C and 9D illustrate a jamming system comprising interdigitated sheets in a jammed state, in accordance with an embodiment.
Figure 9D:
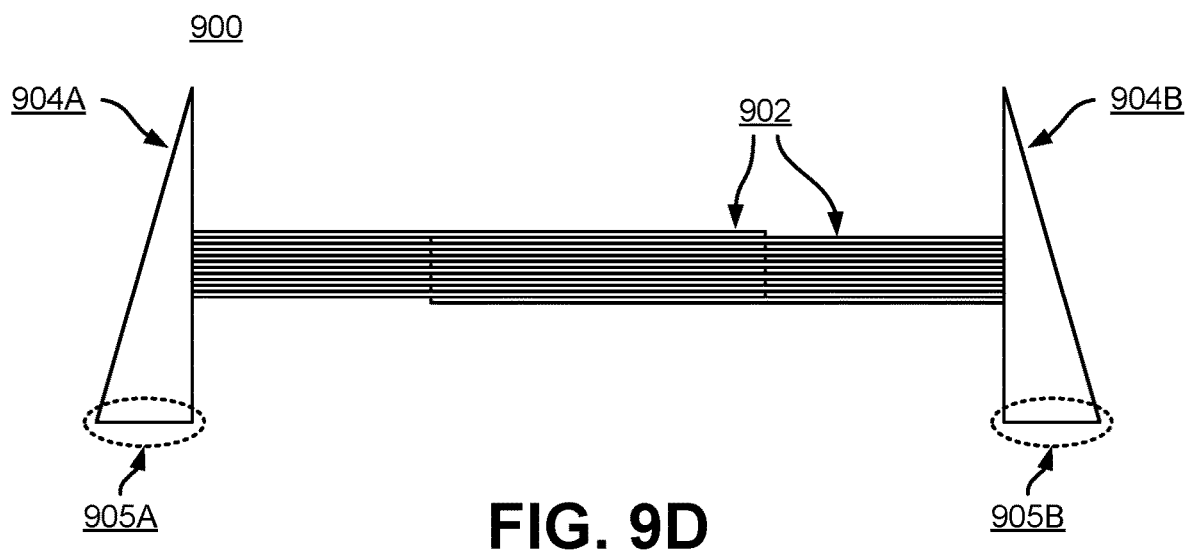

The jamming system 900 operates by applying a force 906 perpendicular to the sheets 902 to press the flexible sheets 902 together, as shown in FIGS. 9C and 9D. When the flexible sheets 902 are pressed together in this manner, the friction between the sheets increases. The friction between the flexible sheets 902 prevents the mounting structures 904 from moving further apart from each other. Thus, applying the perpendicular force 906 has the effect of preventing the user from curling his finger any further.

The perpendicular force 906 can be applied in a number of different ways. In one embodiment, sheets of conductive material are placed above and below the flexible sheets 902 (e.g., one conductive sheet between the bases 905 of the mounting structures 904 and the other conductive sheet between the tips of the mounting structures 904). In this embodiment, the perpendicular force 906 is applied by applying a positive electrical charge to one conductive sheet and a negative electrical charge to the other conductive sheet to generate an electromagnetic force that pulls the two conductive sheets together. In another embodiment, a sheet of magnetic material is placed above or below the flexible sheets 902 and an electromagnet is placed on the opposite side of the flexible sheets 902, and the perpendicular force 906 is applied by activating the electromagnet to pull the electromagnetic toward the magnetic sheet. In still another embodiment, one or more actuators apply mechanical pressure on the flexible sheets to apply the perpendicular force 906. For example, the actuators may make use of an electroactive polymer to apply mechanical pressure. In still another embodiment, the flexible sheets 902 are enclosed in a container of fluid (e.g., air), and the fluid is withdrawn from the container (e.g., with a pump) to compress the flexible sheets against each other. In still another embodiment, an inflatable bladder is placed above or below the flexible sheets 902, and the perpendicular force is applied by inflating the bladder with a fluid (e.g., air) so that the bladder presses against the sheets.

Parallel Filaments

Figure 10A:
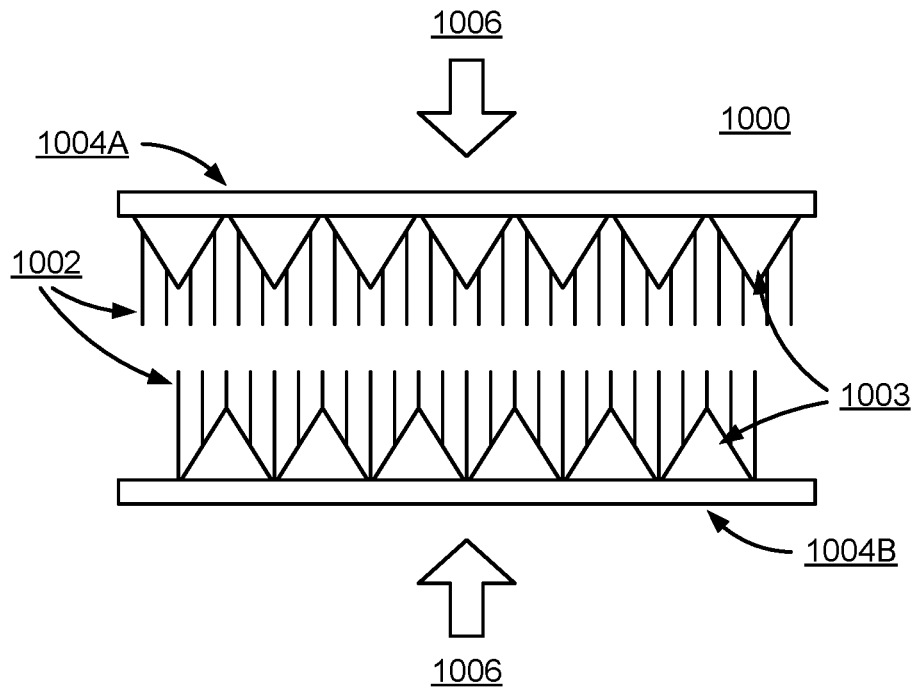
FIG. 10A illustrates a jamming system comprising parallel filaments in an unjammed state, in accordance with various embodiments.

FIGS. 10A-10F illustrate a jamming system 1000 comprising parallel filaments, in accordance with various embodiments. FIG. 10A shows the jamming system 1000 in its unjammed state. The jamming system 1000 comprises a plurality of filaments 1002, a plurality of interlocking teeth 1003, and two mounting structures 1004. The filaments 1002 are flexible elongated members that, in some embodiments, have a consistency similar to the bristles on a brush. The interlocking teeth 1003 are rigid elements that do not buckle or bend by any substantial amount when pressure is applied.

In the embodiment shown in FIG. 10A, the interlocking teeth 1003 are directly mounted on the mounting structures 1004, and the filaments 1002 are mounted on the interlocking teeth 1003. The filaments 1002 extend farther above and below the mounting structures 1004 than the interlocking teeth. In other embodiments, some or all of the filaments 1002 may be directly mounted on the mounting structures 1004. For example, the interlocking teeth 1003 may be spaced farther apart on the mounting structures 1004 and some or all of the filaments 1002 may be mounted in the spaces between the interlocking teeth 1003.

In the unjammed state, the filaments 1002 on the top plate 1004A are not in physical contact with the filaments 1002 on the bottom plate 1004B. In addition, the interlocking teeth 1003 mounted to the upper mounting structure 1004A are not in physical contact with the interlocking teeth 1003 mounted on the lower mounting structure 1004B. As a result, the mounting structures 1004 are free to move parallel to each other. For example, without external pressure, friction between the filaments 1002 is negligible, allowing filaments 1002 on the top plate 1004A to move relative to filaments 1002 on the bottom plate 1004B.

In one embodiment, the jamming system 1000 is secured to a portion of the VR glove 140 corresponding to the dorsal side of a finger. For example, the top mounting structure 1004A and the bottom mounting structure 1004B may be secured to opposite sides of a joint. As stated above with reference to FIGS. 9A-9B, the dorsal side of the finger increases in length when the user curls his finger. If the system 1000 is in its unjammed state, the lack of physical contact between the two sets of filaments 1002 and between the two sets of interlocking teeth 1003 allows the two mounting structures 1004 to slide relative to each other to accommodate the longer dorsal length when the user curls his finger.

Figure 10B:
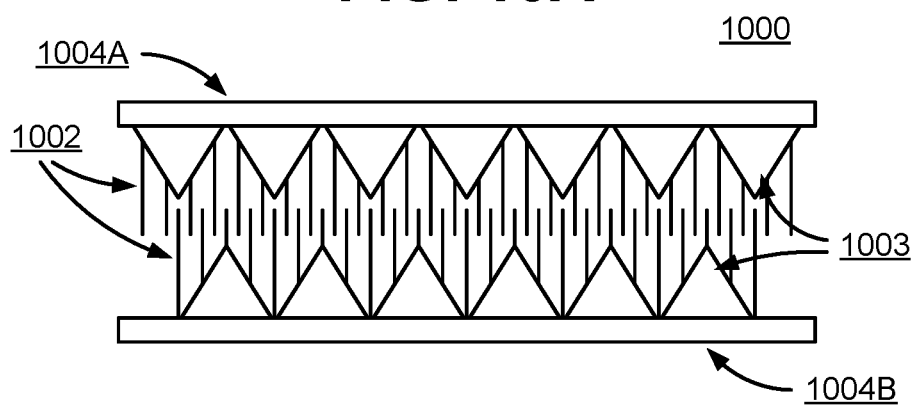
FIG. 10B illustrates a jamming system comprising parallel filaments when a force applied perpendicular to the jamming system causes parallel filaments to contact each other but not engage interlocking teeth, in accordance with an embodiment.
Figure 10C:
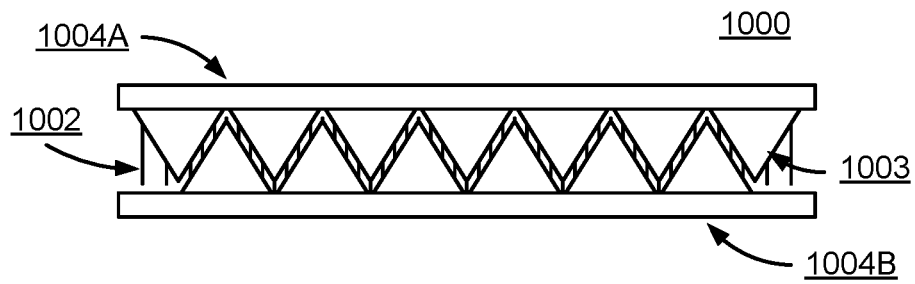
FIG. 10C illustrates a jamming system comprising parallel filaments when a force applied perpendicular to the jamming system causes parallel filaments to buckle and interlocking teeth to engage, in accordance with an embodiment.

The jamming system 1000 operates by applying a force 1006 perpendicular to the mounting structures 1004. The combination of the filaments 1002 and the interlocking teeth 1003 allows the system 1000 to produce different degrees of jamming based on the strength of the perpendicular force 1006 applied. A weaker perpendicular force 1006 causes the filaments 1002 to make contact with each other but does not engage the interlocking teeth 1003, as shown in FIG. 10B. This creates friction between the filaments 1002 and impedes the movement of the joint without preventing joint movement altogether. A stronger perpendicular force 1006 causes the filaments 1002 to buckle and the interlocking teeth 1003 to engage, as shown in FIG. 10C. This prevents the two mounting structures 1004 from moving relative to each other and, in turn, prevents movement of the joint over which the jamming system is secured.

Figure 10D:
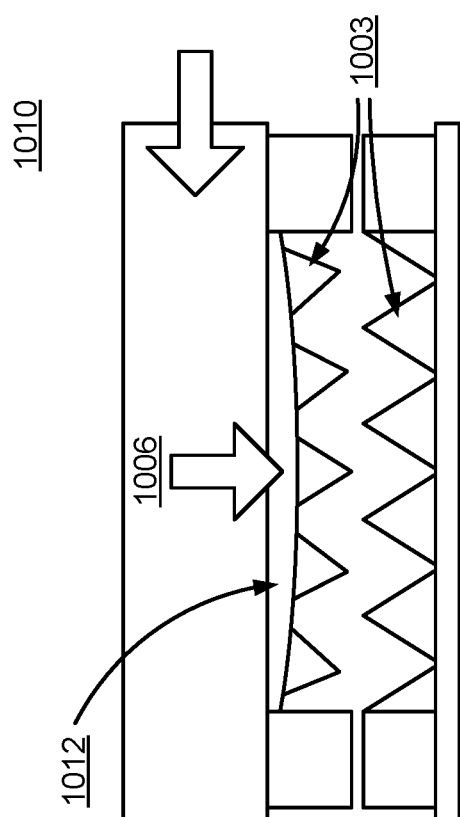
FIG. 10D illustrates a jamming system in which a perpendicular force is applied by inflating a bladder with a fluid, in accordance with an embodiment.

The perpendicular force 1006 can be applied in any of the manners described with reference to FIGS. 9C-9D, such as by applying opposing electric charges to conductive sheets, activating an electromagnetic placed opposite to a magnetic sheet, applying mechanical pressure with one or more actuators, withdrawing a fluid from the area between the mounting structures 1004, or inflating a bladder with a fluid. FIG. 10D illustrates an embodiment of the jamming system 1010 in which the perpendicular force 1006 is applied by inflating a bladder 1012 with a fluid. In this embodiment, the filaments and the upper mounting structure are omitted. Instead, the interlocking teeth 1003 are mounted directly to the surface of the bladder. Other embodiments involving an inflatable bladder may include the filaments and upper mounting structure. For example, the bladder may be positioned above the upper mounting structure and apply the perpendicular force 1006 to the upper mounting structure when inflated.

Figure 10E:
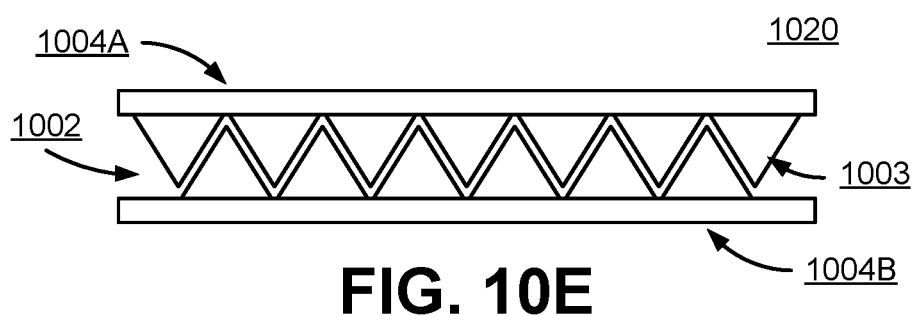
FIG. 10E illustrates a jamming system in which perpendicular force is applied by inflating a bladder with a fluid, in accordance with an embodiment.
Figure 10F:
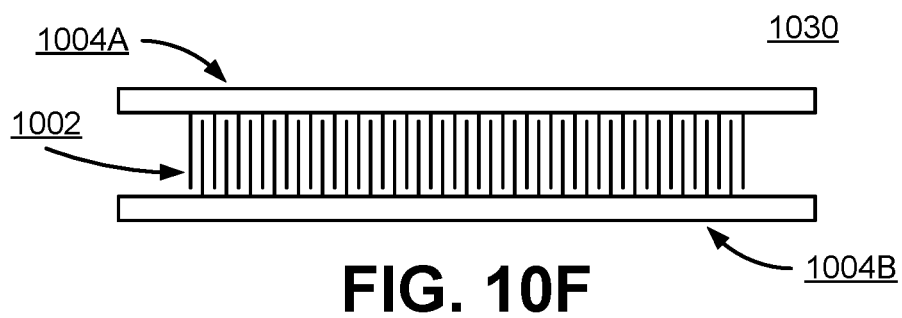
FIG. 10F illustrates a jamming system including parallel filaments without interlocking teeth, in accordance with an embodiment.
Figure 10G:
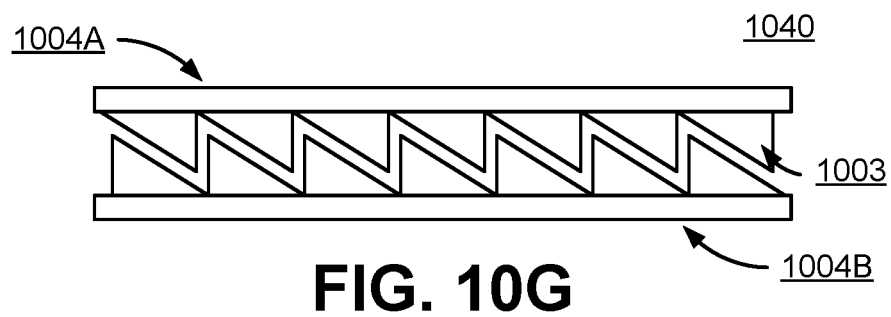
FIG. 10G illustrates i a jamming system including interlocking teeth having a directional pattern, in accordance with an embodiment.

In an alternative embodiment, the filaments are omitted but the interlocking teeth 1003 are still present, as shown in FIG. 10E. In another alternative embodiment, the interlocking teeth are omitted but the filaments 1002 are present, as shown in FIG. 10F. In still another alternative embodiment, the interlocking teeth 1003 have a directional pattern, as shown in FIG. 10G. In this embodiment, the interlocking teeth 1003 allow the mounting structures 1004 to move in one direction but not in the opposite direction when the teeth 1003 are engaged. This may be used, for example, to achieve a ratchet effect that allows a joint to move in one direction but not the other.

Movable Tendons

FIGS. 11A-11B illustrate a jamming system 1100, 1110 comprising a movable tendon, in accordance with various embodiments. The system 1100 shown in FIGS. 11A and 11B include a single movable tendon 1102, an end piece 1106 attached on one end of the tendon 1102, and a blocking structure 1108. The blocking structure 1108 and the end 1104 of the tendon 1102 opposite to the end piece 1106 is also attached to the fabric of the VR glove 140. Meanwhile, the remainder of the movable tendon 1102 not attached to the fabric of the VR glove 140, but it is threaded through a hole in the blocking structure 1108. As a result, the movable tendon 1102 and the end piece 1106 are capable of moving freely relative to the rest of the fabric of the VR glove 140. In some embodiments, the tendon 1102, end piece 1106, and blocking structure 1108 are enclosed in a sheath, and the sheath is attached to the fabric of the VR glove 140 to ensure that the system 1100 remains on the surface of the glove 140.

In one embodiment, the jamming system 1100 is secured to a portion of the VR glove 140 corresponding to the dorsal side of a finger. For example, the blocking structure 1108 may be secured to the knuckle of a finger while the opposite end 1104 is secured to the tip of the finger.

As stated above with reference to FIGS. 9A-9B and 10A-10C, the dorsal side of the finger increases in length when the user curls his finger. Continuing with the example given in the previous paragraph, the opposite end 1104 is pulled away from the blocking structure 1108 as the user curls his finger because the dorsal length (represented by the distance between the opposite end 1104 and the blocking structure 1108) increases. As a result, the end piece 1106 is pulled toward to the blocking structure 1108. When the end piece 1106 is pulled against the blocking structure 1108, the opposite end 1104 cannot be pulled any further from the blocking structure 1108. Thus, the jamming system 1100 limits the maximum dorsal length of the finger, which limits the degree to which the user can curl his finger.

In the alternative embodiment shown in FIG. 11C, the system 1110 includes multiple tendons 1102. Each tendon 1102 is attached to a separate end piece 1106, but the tendons 1102 may be attached to the same end piece in other embodiments. The tendons 1102 are threaded through a single blocking structure 1108 with three holes. In this embodiment, the opposite ends of the tendons 1102 are all secured to the same position on the VR glove 140 (e.g., the same fingertip). Including multiple tendons 1102 in the manner shown in FIG. 11C has the benefit of preventing the force exerted by the tendons 1102 from being concentrated in the same place, which increases the comfort to the user when the tendons 1102 prevent the user from curling his finger any further. In addition, including multiple tendons 1102 allows for the use of thinner tendons 1102, which reduces the profile (i.e., the thickness) of the VR glove 140.

Jamming Mechanism by Moving a Rigid Cuff

Figure 12A:
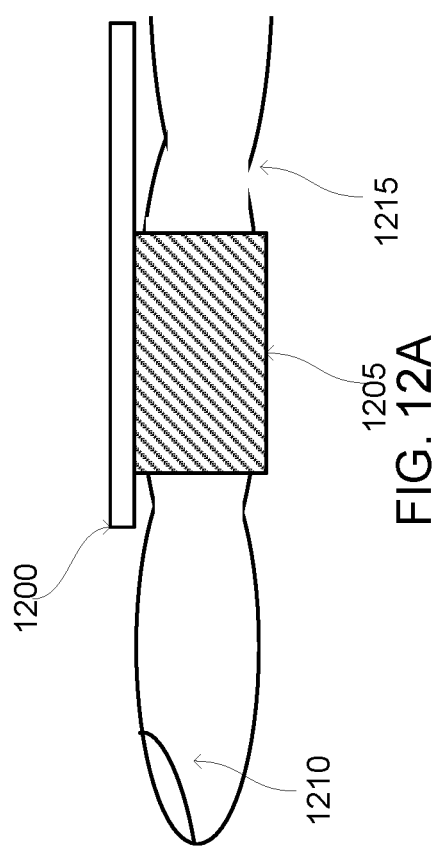
FIGS. 12A and 12B illustrate a jamming mechanism comprising a rigid cuff coupled to a movable tendon, in accordance with various embodiments.

FIG. 12A is a conceptual diagram of a jamming mechanism including a tendon 1200 and a rigid cuff 1205 coupled to the tendon 1200. For purposes of illustration, FIG. 12A shows the jamming mechanism applied to a finger 1210 of a user. However, in other embodiments, the jamming mechanism may be applied to any portion of a user's body. Additionally, while FIG. 12A shows the jamming mechanism as a discrete component, in various embodiments the jamming mechanism is included in a portion of a control adapted to be worn on a portion of the user's body, such as a glove. For example, the rigid cuff 1205 is included in a glove or other component configured to be worn on a portion of the user's body. In some embodiments, a semi-rigid cuff may be used in place of a rigid cuff 1205. Additionally, in some embodiments, the rigid cuff 1205 may have a variable stiffness.

Figure 12B:
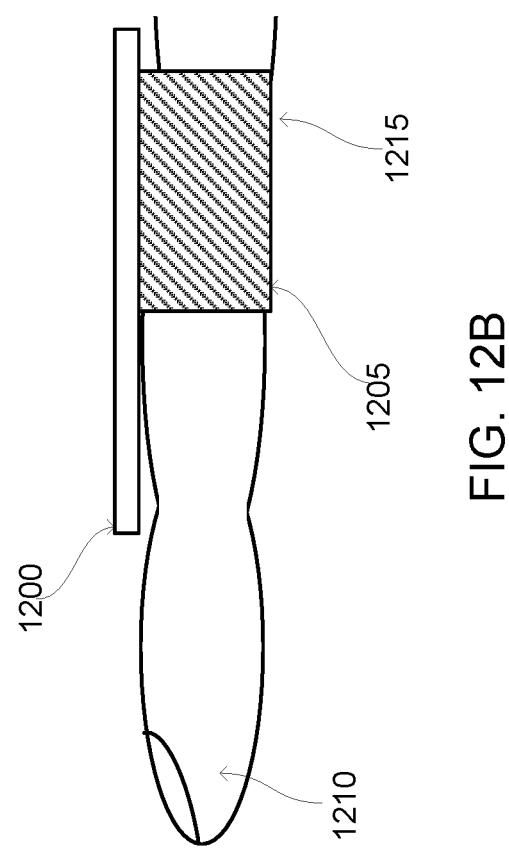

The tendon 1200 includes one or more activation mechanisms that retract the tendon 1200 when activated. For example, an activation mechanism stiffens the tendon 1200, which causes the tendon 1200 to contract. Various activation mechanisms, such as those described above in conjunction with FIGS. 2A-11C, may be used to retract the tendon 1200 in different embodiments. When the tendon 1200 contracts, the rigid cuff 1205 is repositioned to a location that restricts or prevents movement of a portion of the user's body. FIG. 12B shows the jamming mechanism when an activation mechanism of the tendon has been activated and the rigid cuff 1205 has been repositioned. In the example of FIG. 12B, the rigid cuff 1205 is repositioned to cover a joint 1215 of the user's finger 1210, preventing the joint 1215 from bending. If a semi-rigid cuff is included in the jamming mechanism, repositioning the semi-rigid cuff allows a limited range of motion of the user's body (e.g., allows the joint 1215 in FIGS. 12A and 12B to bend less than a threshold amount). Similarly, using a variable stiffness rigid cuff 1210 may allow a limited amount of movement of the user when the rigid cuff 1205 is repositioned.

In various embodiments, the jamming mechanism also includes a retraction mechanism that repositions the rigid cuff 1210 into its original position relative to the user's body, or to another position relative to the user's body, to remove the restriction of movement of the user's body. For example, the retraction mechanism is a spring coupled to the rigid cuff 1205 that is stretched when the rigid cuff 1205 is repositioned. When the activation mechanism included in the tendon 1200 is no longer activated, the spring relaxes, which repositions the rigid cuff 1205 back to its original position or to another position that does not restrict the user's movement. As another example, an additional tendon is coupled to the rigid cuff 1205 and positioned so that when one or more additional activation mechanisms coupled to the additional tendon are activated, the additional tendon is retracted, which repositions the rigid cuff 1205 to a position that does not restrict the user's movement. When activation mechanisms coupled to the tendon 1200 are not activated, additional activation mechanisms coupled to the additional tendon are activated, which causes the additional tendon to contract, repositioning the rigid cuff 1205 away from the position of the rigid cuff 1205 that restricts movement of the user (e.g., repositions the rigid cuff 1205 to its original location). Any suitable activation mechanism may be included in the additional tendon, such as the activation mechanisms further described above in conjunction with FIGS. 2A-11C.

While the preceding discussion of embodiments refers to a virtual reality glove that is adapted to jam the movement of the user's hand, in other embodiments, the jamming systems described herein with reference to a virtual reality glove can be adapted to other types of garments that jam the movement of other parts of the body. For example, the jamming systems disclosed may be applied to garments that jam the movement of the user's elbows, torso, knees, or ankles.

Additional Configuration Considerations

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosed embodiments are intended to be illustrative, but not limiting, of the scope of the disclosure.

What is claimed is:

1. A system comprising:
   a console coupled to an electronic display in a head mounted display, the console configured to provide content to the electronic display for presentation to a user; and
   a glove configured to be worn on a hand of the user and coupled to the console, the glove comprising:
   one or more sensors configured to detect spatial and motion information about the glove and to provide the detected spatial and motion information to the console, and
   a jamming mechanism including a rigid cuff coupled to a tendon and an activation mechanism coupled to the tendon and to the console, the activation mechanism configured to reposition the rigid cuff, the repositioning occurring along a portion of the user's hand and the repositioning caused by retracting the tendon in response to receiving information from the console to counteract a movement detected by the one or more sensors.

2. The system of claim 1, wherein the jamming mechanism further comprises a retraction mechanism coupled to the rigid cuff and configured to reposition the rigid cuff to an alternative position relative to the portion of the hand of the user in response to the activation mechanism no longer retracting the tendon.

3. The system of claim 2, wherein the retraction mechanism comprises a spring configured to be stretched in response to the activation mechanism retracting the tendon and to be relaxed in response to the activation mechanism no longer retracting the tendon.

4. The system of claim 2, wherein the position of the rigid cuff relative to the portion of the hand of the user comprises a position of the rigid cuff restricting movement of the portion of the hand of the user.

5. The system of claim 2, wherein the alternative position of the rigid cuff relative to the portion of the hand of the user comprises a position of the rigid cuff that does not restrict movement of the portion of the hand of the user.

6. The system of claim 2, wherein the alternative position relative to the portion of the hand of the user comprises a position where the rigid cuff was positioned prior to the activation mechanism retracting the tendon.

7. The system of claim 2, wherein the retraction mechanism comprises an additional tendon coupled to the rigid cuff and to an additional activation mechanism, the additional activation mechanism configured to retract the additional tendon when the activation mechanism is not retracting the tendon to reposition the rigid cuff to the alternative position relative to the portion of the hand of the user in response to the activation mechanism no longer retracting the tendon.

8. The system of claim 1, wherein the rigid cuff has a variable stiffness, configured to allow a limited amount of movement of the portion of the hand of the user.

9. The system of claim 1, wherein the tendon comprises a string and the activation mechanism comprises a motor coupled to the glove, the string coupled to a shaft of the motor, the motor configured to rotate and apply a torque to the string in response to receiving information from the console to counteract the movement detected by the one or more sensors.

10. The system of claim 1, wherein the tendon comprises:
    a plurality of inner filaments coupled to a surface of the tendon and protruding from the surface of the tendon; and
    a sheath enclosing the tendon, the sheath having one or more outer filaments coupled to an interior surface of the sheath and protruding from the interior surface of the sheath and configured to press the one or more outer filaments against the one or more inner filaments of the tendon in response to the activation mechanism receiving the information from the console to counteract the movement detected by the one or more sensors.

11. The system of claim 10, wherein the activation mechanism comprises:
    a conductive plate positioned on a side of the sheath; and
    an additional conductive plate positioned on an additional side of the sheath, the additional conductive plate parallel to the conductive plate and the conductive plate configured to receive a positive charge in response to receiving information from the console to counteract the movement detected by the one or more sensors and the additional conductive plate configured to receive a negative charge in response to receiving information from the console to counteract the movement detected by one or more sensors.

12. An apparatus comprising:
    a garment including material configured to be worn on a portion of a body of a user;
    one or more sensors configured to detect spatial and motion information about the garment; and
    a jamming mechanism comprising:
    a rigid cuff coupled to a tendon and coupled to an activation mechanism configured to reposition the rigid cuff, the repositioning occurring along a portion of the user's hand and the repositioning caused by retracting the tendon in response to receiving information to counteract a movement detected by the one or more sensors.

13. The apparatus of claim 12, wherein the jamming mechanism further comprises a retraction mechanism coupled to the rigid cuff and configured to reposition the rigid cuff to an alternative position relative to the portion of the hand of the user in response to the activation mechanism no longer retracting the tendon.

14. The apparatus of claim 13, wherein the retraction mechanism comprises a spring configured to be stretched in response to the activation mechanism retracting the tendon and to be relaxed in response to the activation mechanism no longer retracting the tendon.

15. The apparatus of claim 13, wherein the position of the rigid cuff relative to the portion of the hand of the user comprises a position of the rigid cuff restricting movement of the portion of the body of the user.

16. The apparatus of claim 13, wherein the alternative position of the rigid cuff relative to the portion of the hand of the user comprises a position of the rigid cuff that does not restrict movement of the portion of the hand of the user.

17. The apparatus of claim 13, wherein the alternative position relative to the portion of the hand of the user comprises a position where the rigid cuff was positioned prior to the activation mechanism retracting the tendon.

18. The apparatus of claim 13, wherein the retraction mechanism comprises an additional tendon coupled to the rigid cuff and to an additional activation mechanism, the additional activation mechanism configured to retract the additional tendon when the activation mechanism is not retracting the tendon to reposition the rigid cuff to the alternative position relative to the portion of the hand of the user in response to the activation mechanism no longer retracting the tendon.

19. The apparatus of claim 12, wherein the rigid cuff has a variable stiffness, configured to allow a limited amount of movement of the portion of the hand of the user.

20. The apparatus of claim 12, wherein the tendon comprises a string and the activation mechanism comprises a motor coupled to the garment, the string coupled to a shaft of the motor, the motor configured to rotate and apply a torque to the string in response to receiving the information to counteract the movement detected by the one or more sensors.

* * * * *